US009613463B2

(12) United States Patent
Sugden (10) Patent No.: US 9,613,463 B2
(45) Date of Patent: *Apr. 4, 2017

(54) AUGMENTED REALITY EXTRAPOLATION TECHNIQUES (71) Applicant: Microsoft Technology Licensing, LLC, Redmond, WA (US)

(72) Inventor: Benjamin J. Sugden, Guildford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,729

(22) Filed: Jan. 8, 2016

(65) Prior Publication Data

US 2016/0125658 A1 May 5, 2016

Related U.S. Application Data (63) Continuation of application No. 13/090,446, filed on Apr. 20, 2011, now Pat. No. 9,262,950.

(51) Int. Cl.
G06T 19/00 (2011.01)
G09G 3/00 (2006.01)
G06F 3/00 (2006.01)
G06F 3/01 (2006.01)

(52) U.S. Cl.
CPC ............ *G06T 19/006* (2013.01); *G06F 3/005* (2013.01); *G06F 3/011* (2013.01); *G09G 3/003* (2013.01);

(Continued)

(58) Field of Classification Search
CPC ......... G06T 1/00; G06T 19/006; G06T 7/004; G06T 2207/30244; G06T 15/20;
(Continued)

(56) References Cited

U.S. PATENT DOCUMENTS 6,445,815 B1 9/2002 Sato
7,330,197 B2 2/2008 Kobayashi et al.
(Continued)

OTHER PUBLICATIONS

"Final Office Action", U.S. Appl. No. 13/090,446, May 27, 2015, 32 pages.

(Continued)

*Primary Examiner* — Haixia Du (57) ABSTRACT

Augmented reality extrapolation techniques are described. In one or more implementations, a frame of an augmented-reality display is rendered based at least in part on an optical basis that describes a current orientation or position of at least a part of a computing device. While the frame is rendered, an extrapolation based on a previous basis and a sensor basis generates an updated optical basis that describes a likely orientation or position of the part of the computing device, and the extrapolation is effective to account for a lag time duration between rendering the frame and displaying the frame of the augmented-reality display. The rendered frame of the augmented-reality display is updated before the rendered frame is displayed based at least in part on the updated optical basis that describes the likely orientation or position of the part of the computing device.

20 Claims, 5 Drawing Sheets (52) U.S. Cl.
CPC . *G09G 2320/02* (2013.01); *G09G 2320/0252* (2013.01); *G09G 2320/0261* (2013.01); *G09G 2320/08* (2013.01); *G09G 2354/00* (2013.01); *G09G 2360/12* (2013.01); *G09G 2380/00* (2013.01)

(58) Field of Classification Search
CPC ........ G06T 7/0024; G06F 3/011; G06F 3/012; H04N 13/0278
See application file for complete search history.

(56) References Cited

U.S. PATENT DOCUMENTS

| | | | |
|---|---|---|---|
| 7,395,181 | B2 | 7/2008 | Foxlin |
| 9,262,950 | B2 | 2/2016 | Sugden |
| 2003/0210228 | A1 | 11/2003 | Ebersole et al. |
| 2007/0242086 | A1 | 10/2007 | Tsujimoto et al. |
| 2009/0109241 | A1* | 4/2009 | Tsujimoto ............... H04N 7/18 345/633 |
| 2010/0060632 | A1 | 3/2010 | Lefevre et al. |
| 2010/0220173 | A1 | 9/2010 | Anguelov et al. |
| 2012/0015730 | A1* | 1/2012 | Watkins, Jr. ............ A63F 13/65 463/36 |
| 2012/0268490 | A1 | 10/2012 | Sugden |

OTHER PUBLICATIONS

"Final Office Action", U.S. Appl. No. 13/090,446, Aug. 13, 2014, 28 pages.

"Final Office Action", U.S. Appl. No. 13/090,446, Sep. 24, 2013, 21 pages.

"Non-Final Office Action", U.S. Appl. No. 13/090,446, Feb. 21, 2014, 22 pages.

"Non-Final Office Action", U.S. Appl. No. 13/090,446, Nov. 28, 2014, 28 pages.

"Non-Final Office Action", U.S. Appl. No. 13/090,446, May 17, 2013, 17 pages.

"Notice of Allowance", U.S. Appl. No. 13/090,446, Sep. 11, 2015, 4 pages.

"Technical Considerations on the use of Augmented Reality in Airborne Full Motion Video Applications", Retrieved from <<http://www.churchillnavigation.com/pdfs/ARS_Technical_Considerations.pdf>>, Mar. 11, 2011, 8 pages.

Griebbach,"Real-Time Dense Stereo Mapping for Multi-Sensor Navigation", Retrieved from <<http://www.isprs.org/proceedings/XXXVIII/part5/papers/218.pdf>>, 2010, 6 pages.

Jacobs, "Managing Latency in Complex Augmented Reality Systems", Retrieved from <<http://citeseerx.ist.psu.edu/viewdoc/download;jsessionid=45076AC851A42309985FB284F897E4BF?doi=10.1.1.39.349&rep=rep1&type=pdf>>, 1997, 6 pages.

Pasman,"Distributed Low-latency Rendering for Mobile AR", Retrieved from <<http://mmi.tudelft.nl/~wouter/publications/pasman0le.pdf>>, 2001, 7 pages.

Tobergte, "Robust Multi Sensor Pose Estimation for Medical Applications", Retrieved from <<http://elib.dlr.de/62656/1/TobergteIROS-Sensorfusion.pdf>>, Oct. 15, 2009, 6 pages.

* cited by examiner

AUGMENTED REALITY EXTRAPOLATION TECHNIQUES

RELATED APPLICATIONS

This application is a continuation of and claims priority to U.S. patent application Ser. No. 13/090,446, filed Apr. 20, 2011 entitled "Augmented Reality Extrapolation Techniques", the disclosure of which is incorporated by reference herein in its entirety.

BACKGROUND

Display techniques utilized by computing devices are ever evolving. For example, initial computing devices were provided with monochrome monitors. A user interacted with the computing device by viewing simple text on the monochrome monitor and entering text via a keyboard that could then be viewed on the monitor.

Display techniques were then expanded into use of color and graphical user interfaces. These techniques, for instance, may be utilized to show graphics to represent files, devices connected to the computing device, images, and so on using color. A user may then interact with the graphical user interface using the keyboard as well as by using a cursor control device, such as a mouse.

Display techniques have continued to evolve, such as through the use of glasses to view a three-dimensional television, use of virtual technology, and so on. However, complexities may arise in implementation of these techniques that may make the techniques difficult to implement by traditional computing devices.

SUMMARY

Augmented reality extrapolation techniques are described. In one or more implementations, an augmented-reality display is rendered based at least in part on a first basis that describes a likely orientation or position of at least a part of the computing device. The rendered augmented-reality display is updated based at least in part on data that describes a likely orientation or position of the part of the computing device that was assumed during the rendering of the augmented-reality display.

In one or more implementations, a first basis is calculated that describes a likely position or orientation of at least a part of a computing device. An augmentation is generated by the computing device for display as part of an augmented-reality display based at least in part on the first basis. A modification is calculated to be applied to a rendering of the augmented-reality display that includes the augmentation, the modification based on a second basis that describes a likely orientation or position to which the part of the computing device was moved during the rendering of the augmented-reality display.

In one or more implementations, an apparatus includes a frame buffer, one or more sensors, and one or more modules. The one or more modules are configured to calculate a first basis that describes a likely orientation or position of at least a part of the apparatus in a physical environment, render a frame of an augmented-reality display to the frame buffer that is based at least in part on the first basis, obtain data from the one or more sensors that describes a likely position or orientation of the part of the apparatus in the physical environment during the rendering of the frame in the frame buffer, calculate a second basis using the first basis and the obtained data, and update the frame in the frame buffer based on the second basis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Augmented reality techniques are described. Augmented reality techniques may be utilized to generate a view of a real world environment that is augmented using computer-generated outputs, such as sound or graphics. In this way, a user's view of the real world may include sensory inputs that were generated by a computing device and thus may augment a user's experience.

In the following discussion, augmented reality techniques are described that involve use of a camera and other sensors. For example, a camera may be utilized to capture an image of a physical environment of a computing device, such as a user's media room. The image may then be analyzed to locate markers that give an indication of a position and/or orientation of the camera in relation to the physical environment. Augmented-reality tags (AR tags), for instance, may be used to indicate a distance between the camera and the tags as well as an orientation in relation to the tags. In this way, the image may serve to compute an optical basis for determining an orientation and/or position of the camera in the physical environment.

However, computation of the basis and subsequent rendering of an image involved in an augmented-reality display that leverages the basis may take a relatively significant amount of time such that lag may be introduced to display the image. This lag may therefore cause a user to experience a disjointed viewing experience and thus suspend a belief on the part of the user that an augmented-reality scene looks "real." Techniques are described herein in which a current position of a part of a computing device (e.g., a camera of the device) may be extrapolated during the rendering of the image. This extrapolation may then be used to update a frame that was rendered to a frame buffer based on a previous basis, thereby reducing perceived lag. In this way, the update to the frame may be used to reduce a perception of lag in display of frames that are part of an augmented-reality display. Further discussion of these techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
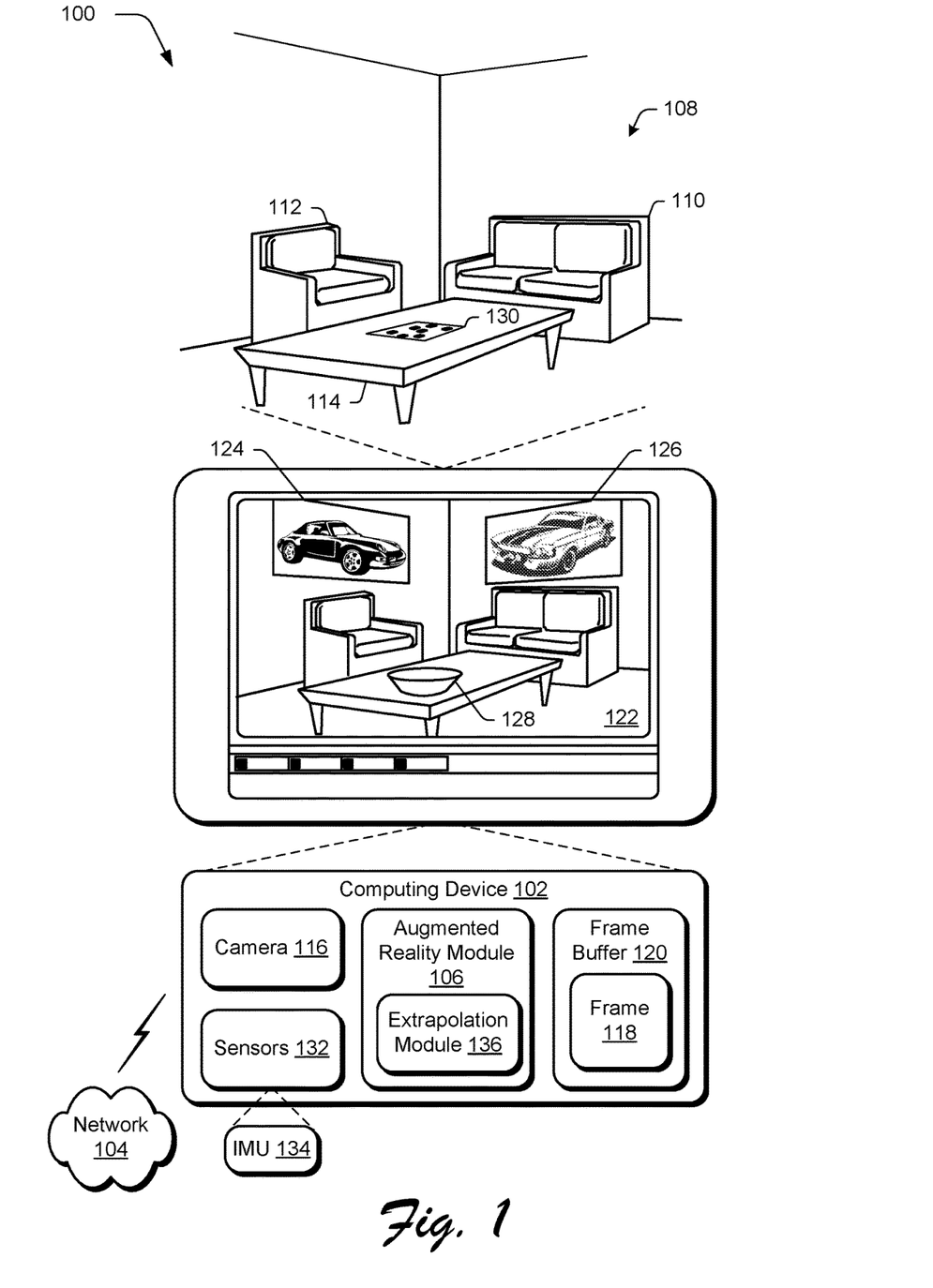
FIG. 1 is an illustration of an environment in an example implementation that is operable to employ augmented reality techniques described herein.

FIG. 1 is an illustration of an environment 100 in an example implementation that is operable to employ augmented reality techniques described herein. The illustrated environment 100 includes a computing device 102, which may be configured in a variety of ways. For example, although the computing device 102 is illustrated as a mobile communication device (e.g., tablet, wireless telephone), the computing device 102 may be configured in a variety of other ways. For instance, the computing device 102 may be configured as a computer that is capable of communicating over a network 104, such as a desktop computer, a mobile station, an entertainment appliance, a set-top box communicatively coupled to a display device, a game console, and so forth.

Accordingly, the computing device 102 may range from full resource devices with substantial memory and processor resources (e.g., personal computers, game consoles) to low-resource devices with limited memory and/or processing resources (e.g., traditional set-top boxes, hand-held game consoles). Additionally, although a single computing device 102 is shown, the computing device 102 may be representative of a plurality of different devices, such as a user-wearable helmet and game console, multiple servers utilized by a business to perform operations that provide a platform "in the cloud," a remote control and set-top box combination, and so on.

The computing device 102 is also illustrated as including an augmented reality module 106. The augmented reality module 106 is representative of functionality of the computing device 102 to augment a view of real-world surroundings of the computing device 102. In the illustrated example, for instance, the computing device 102 is illustrated as being physically present in a room 108 that has a couch 110, a chair 112, and a table 114 that are positioned in a corner of the room 108.

The computing device 102 includes a camera 116 that is configured to capture one or more images of the physical surroundings of the computing device 102, e.g., the room 108 in this example. These one or more images may be used to capture a view of the "reality" that is to be augmented, although other input devices are also contemplated such as microphones. The augmented reality module 106 may receive data from the camera 116 (e.g., the one or more images) to generate a frame 118, which is illustrated as being stored in a frame buffer 120 of the computing device 102.

The frame 118 may then be displayed by a display device 122 of the computing device 102, which although illustrated as part of a mobile communication device may assume a variety of configurations. In one or more implementations, the display device 122 may be included as part of a helmet and positioned for viewing by one or more of a user's eyes. Additionally, the display device 122 may or may not be partially transparent. For example, the display device 122 may be configured to display both the image captured by the camera 116 along with augmentations. In another example, the display device 122 may be configured to display the augmentations without the view of the image captured by the camera 116, but permit a view of the physical surroundings to be seen through at least a portion of the display device 122. Thus, the augmentation generated by the augmented reality module 106 may be displayed in a variety of ways.

In the illustrated example, the frame 118 displayed by the display device 122 includes an image captured by the camera 116. The frame 118 also includes a plurality of augmentations that were generated by the augmented reality module 106. Illustrated examples displayed by the display device 122 include first and second pictures 124, 126 that appear positioned on walls of the room 108 as well as a bowl 128 that appears to be placed on the table 114. Thus, the augmented reality module 106 may augment the view of reality displayed by the display device 122. It should be readily apparent that augmentations generated by the augmented reality module 106 may assume a variety of other forms, such as objects as part of a game and other changes to a view of the surroundings of a computing device 102.

To generate this view and know "where" to place to augmentations, the augmented reality module 106 may leverage a variety of techniques to determine an orientation and/or position of the computing device 102 in relation to the environment, e.g., the room 108 as illustrated. For example, the augmented reality module 106 may leverage one or more markers to determine how the computing device 102 is positioned, oriented, moved, and so on. These markers may take a variety of forms. For instance, the augmented reality module 106 may set one or more view points in the living room as markers and thus serve as a basis to determine orientation and/or positioning, such as a corner of the table 114, orientation of the chair 112, and so on. Thus, the items in the room may act as a basis to determine where the computing device 102 is located within the room.

In another instance, the augmented reality module 106 may leverage a view of one or more augmented reality (AR) tags that are physically positioned within the surrounding environment of the computing device 102. An example AR tag 130 is illustrated as positioned on the table 114 in the living room 108. Although a single AR tag 130 is shown, a plurality of AR tags may be utilized in the environment. The example AR tag 130 (or other markers) may be used as a basis to determine depth (e.g., distance between the AR tag 130 and the camera 116), three-dimensional orientation of the computing device 102 with respect to the AR tag 130, and so forth.

For example, the AR tag 130 may include a pattern that may be recognized by the augmented reality module 106 to determine a distance from the AR tag 130 and/or an orientation of the computing device 102 in relation to the AR tag 130. In this way, markers may be leveraged by the augmented reality module 106 to determine "where" and "how" the computing device 102 is positioned in a physical environment. The augmented reality module 106 may use this determination as a basis to generate augmentations to be output for viewing by a user of the computing device 102.

The augmented reality module 106 may also leverage one or more sensors 132 to determine and verify a position and/or orientation of the computing device 102. For example, the sensors 132 may be configured as an inertial measurement unit (IMU), which may include a gyroscope, one or more accelerometers, a magnetometer, and so on including any combination thereof. These units may be used to generate an external basis with which to verify a basis generated using the optical marking techniques previously described. For example, a basis generated using the optical marking techniques described above that leverages the camera 116 may be evaluated for discrepancies using a basis generated by the one or more sensors, e.g., an IMU 134. In this way, the techniques may be used to determine an orientation and position of the computing device 102 in relation to its physical surroundings, further discussion of which may be found in relation to FIG. 2.

The augmented-reality module 106 is further illustrated as including an extrapolation module 136. The extrapolation module 136 is representative of functionality of the computing device 102 to extrapolate a position or orientation of the computing device. For example, the extrapolation module 136 may be used to generate a current basis that describes a likely current position or orientation of at least a part of the computing device 102 based at least in part on a previous basis and data obtained subsequent to the previous basis. The extrapolation module 136, for instance, may be leveraged when an optical basis computed from data obtained from the camera does not approximately correspond with a sensor basis computed from data obtained from the one or more sensors. In this way, the extrapolation module 136 may function to provide a consistent viewing experience in instances where an erroneous basis was likely computed, further discussion of which may be found in relation to FIG. 2.

Additionally, the extrapolation module 136 may be used to reduce a perceived lag in rendering of frames 118 to the frame buffer 120. For example, the extrapolation module 136 may continue to receive data from the one or more sensors during a rendering of the frame 120. This data may be used to update a basis that was used to generate the frame 120 and therefore may also be used to update the frame 120 itself to approximately correspond to the updated basis. Therefore, the updated rendered frame may be displayed to reduce lag by being updated to approximately correspond to a likely position or orientation to which a part of the computing device 102 was moved during the rendering. Further discussion of use of the extrapolation module 136 to generate an update may be found in relation to FIG. 3.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

For example, the computing device 102 may include an entity (e.g., software) that causes hardware of the computing device 102 to perform operations, e.g., processors, functional blocks, and so on. The computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
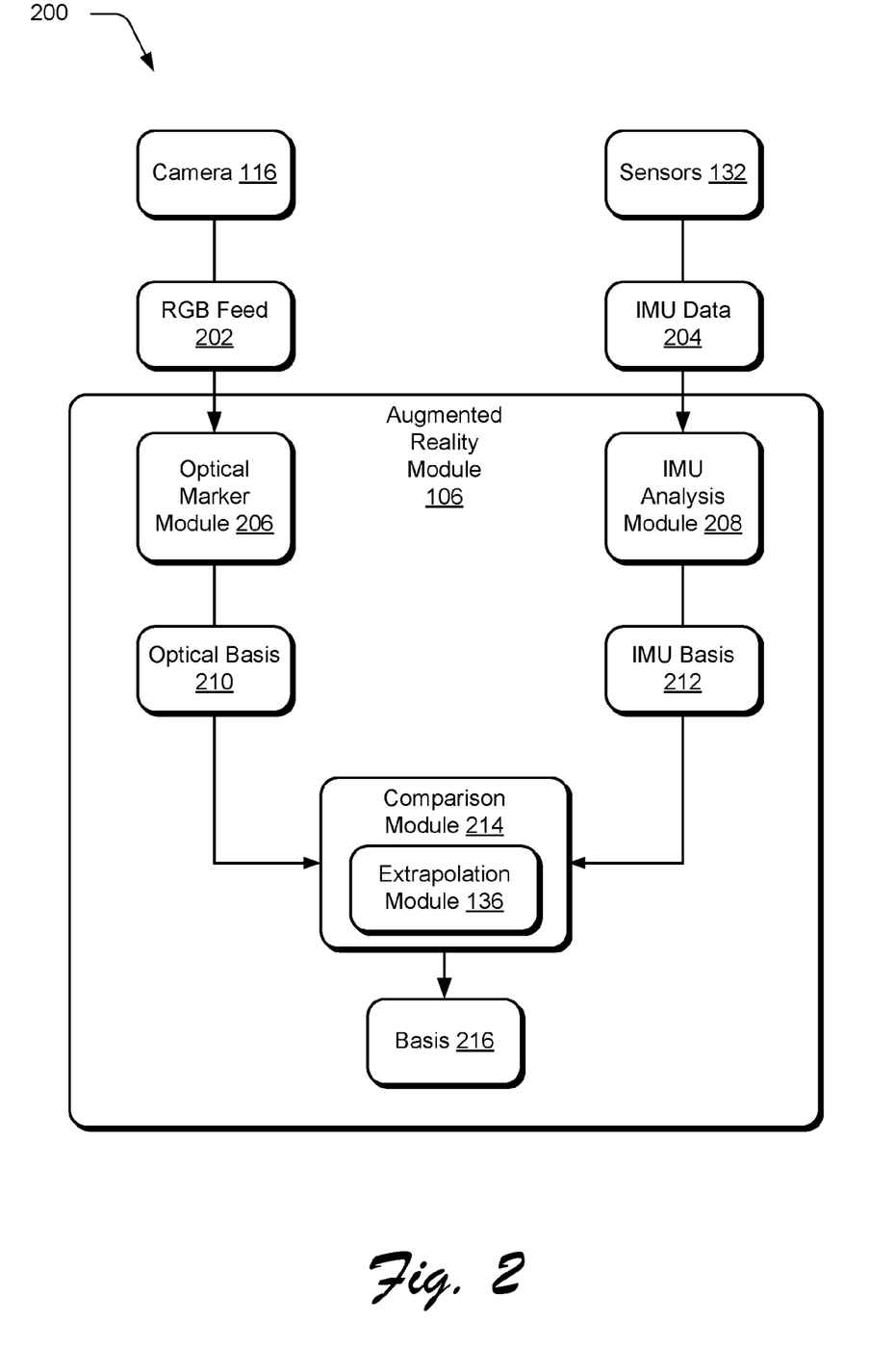
FIG. 2 is an illustration of a system in an example implementation showing an augmented reality module of FIG. 1 in greater detail as being employed for basis generation for a computing device that leverages both a camera and sensors.

FIG. 2 is an illustration of a system 200 in an example implementation showing the augmented reality module 106 of FIG. 1 in greater detail as being employed for basis generation for the computing device 102 that leverages both the camera 116 and the sensors 132. The augmented reality module 106 in this example receives a red/green/blue (RGB) feed 202 from the camera 116 and IMU data 204 from the sensors 132.

The augmented reality module 106 then processes the RGB feed 202 using an optical marker module 206 and the IMU data 204 using an IMU analysis module 208. This processing may be used to generate an optical basis 210 and an IMU basis 212, respectively, for determining orientation, position, and/or distance of the computing device 102 in a physical environment. A comparison module 214 may then be employed by the augmented reality module 106 to "cross check" the optical and IMU bases 210, 212.

For example, the comparison module 214 may receive the optical basis 210 and determine whether the optical basis 210 is consistent with the IMU basis 212. If the optical basis 210 is consistent with the IMU basis 212, the comparison module 214 may then output the basis 216. However, if the optical basis 210 is not consistent, the comparison module 214 may leverage the extrapolation module 136 to compare the optical basis 210 with a previous point in time, such as for a previous frame captured by the camera 116 (e.g., a previous optical basis 210), previous IMU data 204, and so forth. For instance, the extrapolation module 136 may use the last "good" optical basis 210 (e.g., verified using the comparison module 214) and use "current" IMU data 204 to predict a likely basis for the computing device 102.

By employing the camera 116 with the sensors 132 near simultaneously, these techniques may be used to generate a basis 216 having a higher degree of confidence than if performed separately. For instance, use of the optical basis 210 alone for the registration of a camera 116 location may not be robust in instances because some frames may fail to be classified correctly, which may cause jarring errors in a resulting augmented-reality display.

For example, the display of object that is used to augment the view of reality may suddenly flip around an axis, translate an unreasonable amount, and so forth. If the object is supposed to be fixed in space, for instance, this may suggest to the viewer that the viewer has moved, even when the viewer has not and thereby break the illusion that the object is included in the real world environment.

Figure 3:
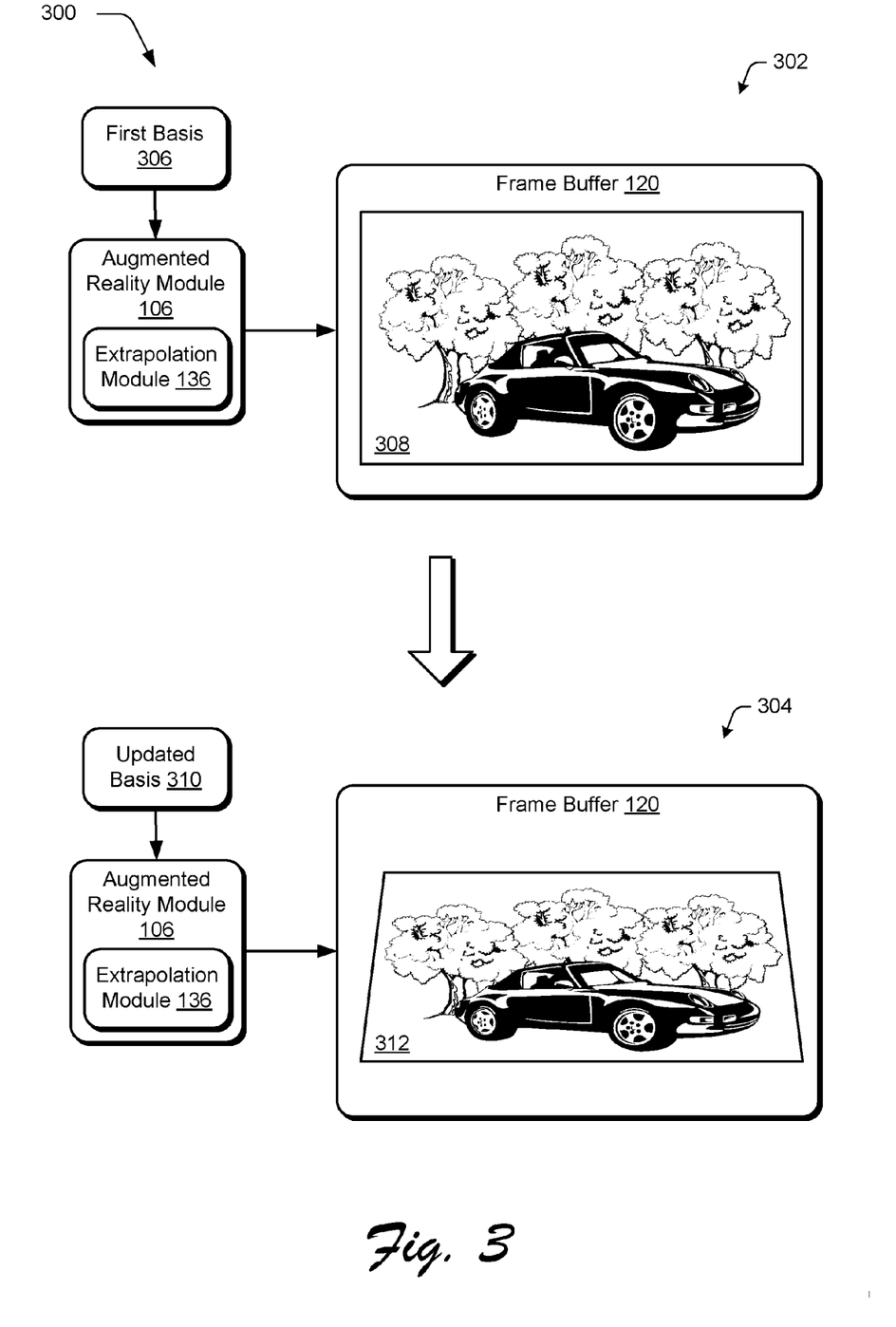
FIG. 3 depicts a system in an example implementation in which an extrapolation module of FIG. 1 is used to update a frame in a frame buffer.

On the contrary, use of the IMU data 204 alone may not provide a particularly accurate basis function in some instances (e.g., over an extended period of time) due to drifting. However, the IMU data 204 may work to provide a metric by which to qualify the optical basis 210 and therefore the combination may be used to determine a basis with a higher degree of confidence. The extrapolation module 136 may also employ techniques to counteract a lag in rendering of frames 118 to a frame buffer 120, further discussion of which may be found in relation to the following figure.

FIG. 3 depicts a system 300 in an example implementation in which the extrapolation module 136 of FIG. 1 is used to update a frame in a frame buffer 120. The system 300 is illustrated as using first and second stages 302, 304. At the first stage 302, the augmented reality module 106 is illustrated as obtaining a first basis 306 that describes a likely orientation or position of part of the computing device 102. This first basis 306 may then be used to generate a frame 308 that is illustrated as being rendered to the frame buffer 120. In this example, the frame 308 is of an object (e.g., a picture) that is positioned as generally perpendicular to line of sight of a viewer of the picture.

At the second stage, the augmented reality module 106 is illustrated as leveraging an updated basis 310 by the extrapolation module to generate an updated frame 312 in the frame buffer 120. For example, the extrapolation module 136 may continue to receive data that describes a likely position or orientation of a part of the computing device 102, such as from the one or more sensors. This data may then be used to generate the updated basis 310 that describes a likely position or orientation of a part of the computing device 102 when the frame 312 is to be displayed. The extrapolation module 136 may therefore update the frame 308 to form an updated frame 312 that corresponds to this likely position or orientation. In the illustrated example, the extrapolation module 136 skews the frame 308 to correspond to the updated basis 310. In this way, the extrapolation module 136 may reduce and even eliminate a perceived lag in the generation of a basis, rendering of frames, and display of the frames by the computing device 102.

The following includes example source code that may be used to implement these features:

---

Reprojection Pixel Shader code (input.uv goes from 0 - 1 for U and V)
//----------------------------------------------------------------------------------
--------
float4 PS_Reproject( VS_OUT input ) : SV_Target
{
    float4 this_pos    = float4( input.uv.x * 2.0f – 1.0f,
    1.0 – input.uv.y *
2.0f, 1.0f, 1.0f );
    float4 new_pos;
    float2 new_uv;
    new_pos    = mul( this_pos, m_reprojectTransform );
    new_pos.xyz    /= new_pos.w;
    new_uv    = float2( ( new_pos.x + 1.0f ) / 2.0f, ( 1.0f –
new_pos.y ) / (2.0f) );
    return m_textureSampler.SampleLevel( samLinearClamp,
    new_uv, 0 );
}
Reprojection C++ code
//----------------------------------------------------------------------------------
//
// setup new camera to point in the new direction
//
//----------------------------------------------------------------------------------

-continued

NMaths::Mat4x4 delta = CHeadSet::GetInstance( )-
>GetLastMatrixWeUsed( ).GetInverseOrtho( ) *
    CHeadSet::GetInstance( )->GetNewMatrixFromDevice( );
s_reprojectionCamera->SetTransform( delta * s_sceneCamera –
>GetTransform( ) ); // this is a camera matrix (ie inverse of view matrix)
//----------------------------------------------------------------------------------
//
// get relative transform from backbuffer to projected space
//
//----------------------------------------------------------------------------------
NMaths::Mat4x4 reproject_matrix;
reproject_matrix = s_reprojectionCamera-
>GetViewProjMatrix( ).GetInverse( ) * s_sceneCamera-
>GetViewProjMatrix( );
SET_RESOURCE( m_shader, m_textureSampler, screen_texture );
SET_MATRIX( m_shader, m_reprojectTransform, reproject_matrix );
CPostProcessor::RenderScreenQuad( m_Reproject );

---

Further discussion of processing performed by the extrapolation module 136 may be found in relation to the following procedures.

Example Procedures

The following discussion describes augmented reality techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200, 300 of FIGS. 2 and 3.

Figure 4:
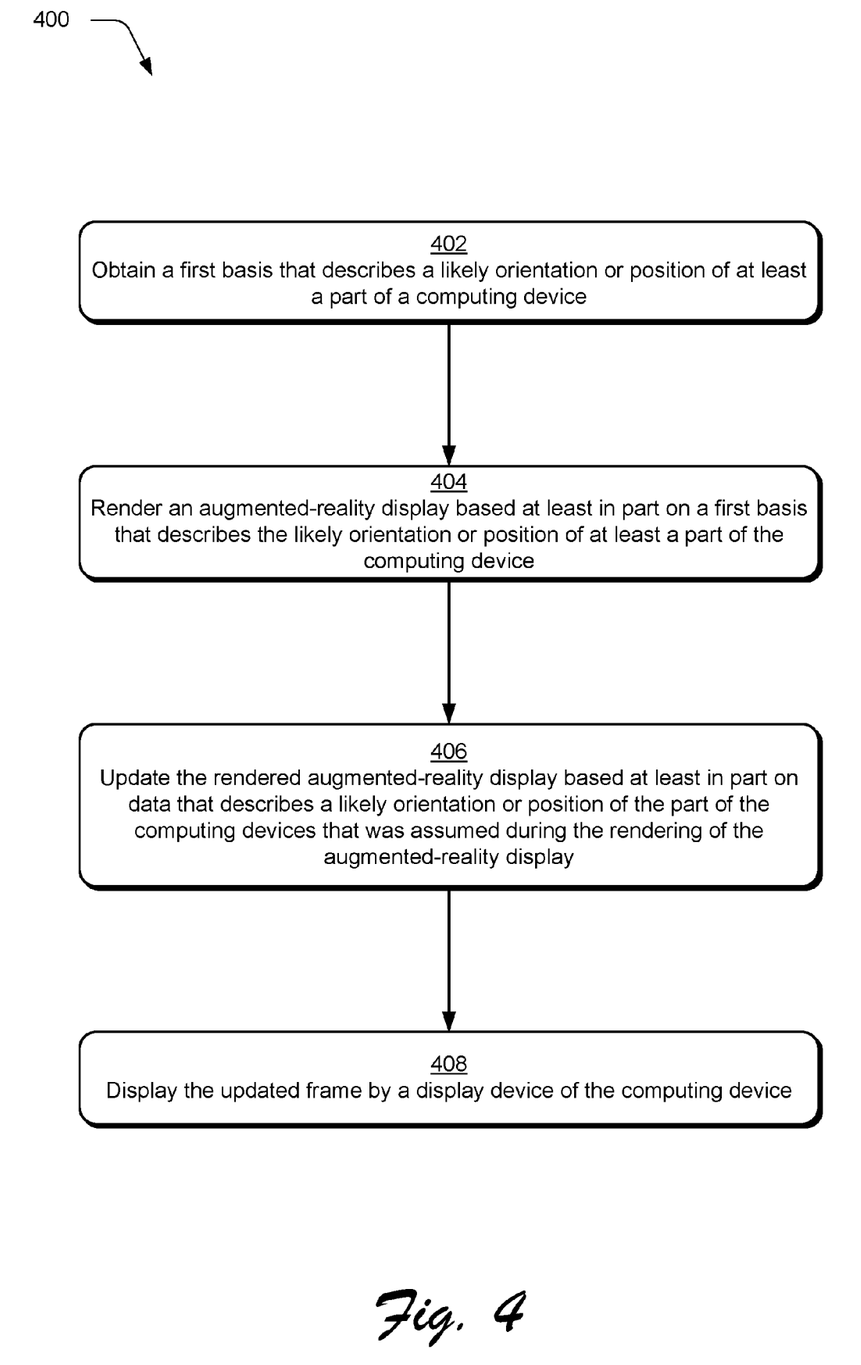
FIG. 4 is a flow diagram depicting a procedure in an example implementation in which a rendered augmented-reality display is updated based at least in part on a likely orientation or position of a part of the computing device that was assumed during the rendering of the augmented-reality display.

FIG. 4 depicts a procedure 400 in an example implementation in which a rendered augmented-reality display is updated based at least in part on a likely orientation or position of a part of the computing device that was assumed during the rendering of the augmented-reality display. A first basis is obtained that describes a likely orientation or position of at least a part of a computing device (block 402). The augmented reality module 106, for instance, may receive a first basis 306. The first basis 306 may be generated in a variety of ways, such as an optical basis 210 calculated using images taken by a camera 116, a sensor basis (e.g., an IMU basis 212) obtained from an IMU analysis module 208, a combined basis 216 (e.g., in which an optical basis 210 is verified by the IMU basis 212), and so forth.

An augmented-reality display is rendered based at least in part on the first basis that describes the likely orientation or position of at least a part of the computing device (block 404). The augmented-reality module 106, for instance may render a frame 306 that includes an object generated for inclusion with an image taken of the physical surroundings of the computing device 102. This frame 306 may be generated to correspond with a likely perspective of a user that is to view the frame 306.

The rendered augmented-reality display is then updated based at least in part on data that describes a likely orientation or position of the part of the computing device that was assumed during the rendering of the augmented-reality display (block 406). The part of the computing device 102, for instance, may have moved during the rendering of the frame 306 to the frame buffer 120, such as movement of a user's head on which the camera is positioned 106, movement of the user as a whole (e.g., walking), and so forth.

Data may be obtained by the extrapolation module 136 during the rendering (e.g., from the one or more sensors 132)

that may be used to update the first basis 306. For example, the one or more sensors 132 may operate at a frequency that is faster than a rate at which frames 118 may be rendered to the frame buffer 120. Therefore, this information may be used to form an updated basis 310 to describe a likely position or orientation assumed by the part of the computing device 102 during the rendering. For example, the updating may be performed by extrapolating a new camera basis by integrating velocities read from the one or more sensors 132 of the computing device 102 that are not a camera and compositing the velocities with the first basis 306 that was used in the rendering of the frame 306.

Thus, the updated basis 310 may be used to update the frame 306 to generate an updated frame 312 that reflects a likely perspective for a user of the computing device 102. This updating may be performed the display of the frame 306 such that a user may have a consistent viewing experience. The updated frame 312 may then be displayed by a display device of the computing device (block 408) for viewing by a user.

Figure 5:
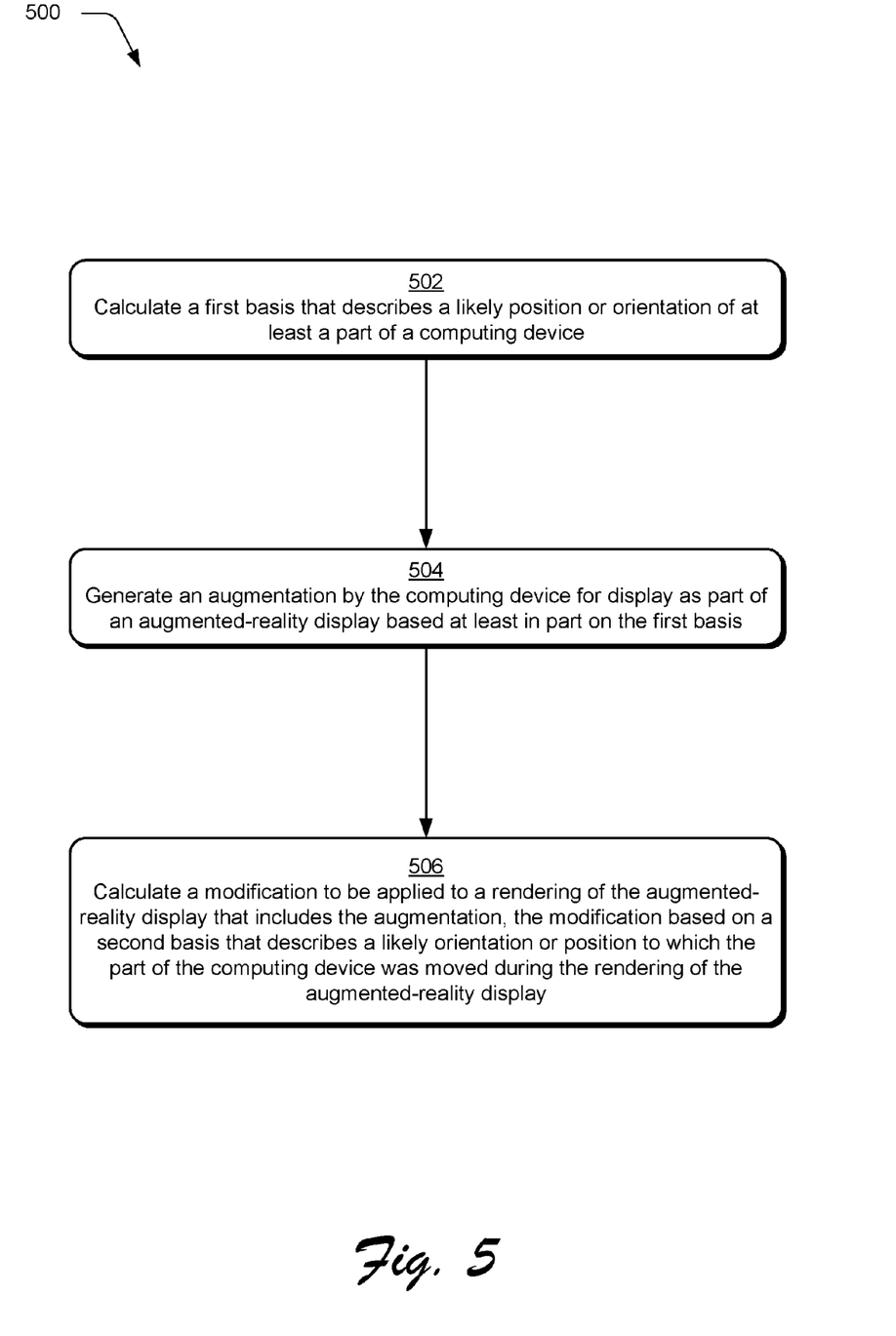
FIG. 5 is a flow diagram depicting a procedure in an example implementation in which an augmentation to be applied to an augmented-reality display is modified based on a basis that describes a likely orientation or position to which a part of a computing devices was moved during rendering of the augmented-reality display.

FIG. 5 depicts a procedure 500 in an example implementation in which an augmentation to be applied to an augmented-reality display is modified based on a basis that describes a likely orientation or position to which a part of a computing devices was moved during rendering of the augmented-reality display. A first basis is calculated that described a likely position or orientation of at least a part of a computing device (block 502). The first basis, for instance, may be a combined basis 216 (e.g., an optical basis 210 verified using a sensor basis, an averaged optical basis 210 and IMU basis 212, and so on), an optical basis 210, an IMU basis 212, an extrapolated basis 136 from a previous optical basis 210 and IMU data 204, and so forth.

An augmentation is generated by the computing device for display as part of an augmented-reality display based at least in part on the first basis (block 504). The augmentation may take a variety of forms, such as an object to be displayed as part of the augmented-reality display that is generated by the computing device 102 to appear as if it is actually there. The augmentation (and in some instances an image taken of the physical surroundings of the computing device 102) may be rendered to a frame buffer 120 of the computing device 102 or another computing device.

A modification is calculated to be applied to a rendering of the augmented-reality display that includes the augmentation, the modification based on a second basis that describes a likely orientation or position to which the part of the computing device was moved during the rendering of the augmented-reality display (block 506). Continuing with the previous example, a second basis may be computed to describe movement that is subsequent to the first basis. The second basis may thus serve as a basis to update the first basis that was used to render the augmented-reality display. In this way, lag associated with the rendering may be reduced. A variety of different techniques may be used to modify the display, such as to skew all or a portion of a frame to reflect a perspective described by the second basis.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    rendering a frame of an augmented-reality display based at least in part on an optical basis that describes a current orientation or position of at least a part of the computing device;
    receiving, while rendering the frame, sensor data from one or more sensors;
    generating, during the rendering of the frame, a sensor basis based on the sensor data obtained from an inertial measurement unit of the computing device that describes the current orientation or position of at least the part of the computing device;
    extrapolating, while rendering the frame, based on a previous basis and the sensor basis to generate an updated optical basis that describes a likely orientation or position of the part of the computing device, the previous basis being a previous optical basis or a previous sensor basis prior to the optical basis that describes the current orientation or position, the sensor basis based on the sensor data received while rendering the frame, said extrapolating effective to account for a lag time duration between said rendering the frame and displaying the frame of the augmented-reality display; and
    updating the rendered frame of the augmented-reality display before the rendered frame is displayed, said updating based at least in part on the updated optical basis that describes the likely orientation or position of the part of the computing device.

2. A method as described in claim 1, wherein:
    the rendering the frame of the augmented-reality display causes the frame to be stored in a frame buffer of the computing device; and
    the updating is performed on the rendered frame of the augmented-reality display that is stored in the frame buffer of the computing device.

3. A method as described in claim 1, wherein the updating is performed before said displaying the rendered augmented-reality display by a display device of the computing device.

4. A method as described in claim 1, further comprising:
    determining, during the rendering of the frame, that the optical basis is not consistent with the sensor basis to describe the likely orientation or position of the part of the computing device.

5. A method as described in claim 4, wherein the inertial measurement unit includes at least one of a gyroscope, an accelerometer, or a magnetometer.

6. A method as described in claim 1, wherein the extrapolating uses the optical basis and at least one of the sensor data and optical data obtained subsequent to calculation of the optical basis to produce an extrapolated second basis.

7. A method as described in claim 1, wherein the optical basis is generated based on camera optical data and the extrapolating generates the updated optical basis by integrating velocities read from the one or more sensors of the computing device that are not a camera and compositing the velocities with the optical basis that was used in the rendering.

8. A method as described in claim 1, wherein the augmented-reality display includes a view of an image captured by a camera of the computing device and an object generated by the computing device to be added to the image, the generation of the object based at least in part on the optical basis.

9. A method implemented by a computing device, the method comprising:
  calculating a first basis from a sensor that describes a likely position or orientation of at least a part of the computing device;
  generating an augmentation by the computing device for display as part of an augmented-reality display based at least in part on the first basis;
  calculating a second basis from another, different sensor that describes an updated orientation or position to which the part of the computing device was moved during the rendering of the augmented-reality display;
  determining, during the rendering of the augmented-reality display, that the first basis is not consistent with the second basis to describe the likely position or orientation of the part of the computing device;
  calculating, while rendering the augmented-reality display, a modification to be applied to the rendered augmented-reality display that includes the augmentation, the modification based on the second basis; and
  updating the rendered augmented-reality display before the rendering is displayed, said updating the rendered augmented-reality display based on the calculated modification.

10. A method as described in claim 9, wherein the generated augmentation is effective to implement an object appearing to be added to a physical environment of the computing device.

11. A method as described in claim 9, wherein the second basis is computed by interpolating the first basis using data obtained from one or more sensors of the computing device, the one or more sensors configured as an inertial measurement unit that includes at least one of a gyroscope, an accelerometer, or a magnetometer.

12. A method as described in claim 9, further comprising:
  displaying the augmented-reality display by the computing device using one or more display devices.

13. A method as described in claim 9, wherein the first basis is formed by verifying an optical basis calculated using optical data taken by a camera of the computing device with a sensor basis calculated using sensor data obtained from one or more sensors that are not a camera.

14. An apparatus comprising:
  a frame buffer;
  one or more sensors that describe a likely orientation or position of at least a part of the apparatus in a physical environment; and
  at least one processor and a memory configured to store one or more modules executable by the at least one processor and configured to:
  calculate a first basis from a sensor of the one or more sensors that describes the likely orientation or position of the part of the apparatus in the physical environment;
  render a frame of an augmented-reality display to the frame buffer that is based at least in part on the first basis;
  obtain, while the frame is being rendered, sensor data from a different sensor of the one or more sensors, the different sensor describing an updated orientation or position of the part of the apparatus in the physical environment while the frame is rendered in the frame buffer;
  calculate, while the frame is being rendered, a second basis using the first basis and the obtained sensor data from the different sensor;
  extrapolate, while the frame is being rendered, an updated first basis using the second basis, the extrapolation effective to account for a lag time duration between the frame being rendered to the frame buffer and the frame being displayed; and
  update the frame in the frame buffer before the frame is displayed, the frame updated based on the extrapolated updated first basis.

15. An apparatus as described in claim 14, wherein the one or more modules are further configured to:
  determine, while the frame is being rendered, that the first basis does not correspond with the second basis.

16. An apparatus as described in claim 14, wherein the one or more sensors include at least one of an inertial measure unit which includes a gyroscope, an accelerometer, or a magnetometer.

17. An apparatus as described in claim 14, further comprising a display device to display the rendered frame, the display device configured to be wearable by a user.

18. An apparatus as described in claim 17, wherein the rendered frame is updated in the frame buffer before the frame is displayed by the display device.

19. An apparatus as described in claim 14, wherein the one or more sensors are not a camera and the first basis is formed at least in part using optical data obtained via a camera.

20. An apparatus as described in claim 14, wherein the augmented-reality display includes an augmentation and an image captured using a camera of the apparatus.

* * * * *